United States Patent
Minnick

(10) Patent No.: US 6,500,790 B1
(45) Date of Patent: Dec. 31, 2002

(54) MAGNETIC WIRE EXTERNAL LUBRICANT

(75) Inventor: Michael G. Minnick, Fort Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/875,903

(22) Filed: Jun. 8, 2001

(51) Int. Cl.$^7$ .................. C10M 173/00; F01M 9/00
(52) U.S. Cl. .................. 508/505; 508/559; 508/579; 252/68; 184/6.16
(58) Field of Search ........................... 508/505

(56) References Cited

U.S. PATENT DOCUMENTS

| | | | | |
|---|---|---|---|---|
| 3,507,792 A | * | 4/1970 | Zuraw ........................ | 508/505 |
| 3,726,799 A | * | 4/1973 | McDole et al. ............. | 508/505 |
| 4,378,407 A | | 3/1983 | Yamamoto et al. ......... | 428/383 |
| 4,454,197 A | | 6/1984 | Laganis et al. ............. | 428/379 |
| 4,776,970 A | * | 10/1988 | Hayashi et al. ............. | 508/505 |
| 4,915,859 A | * | 4/1990 | Kerr et al. .................. | 72/42 |
| 5,750,046 A | * | 5/1998 | Wheeler ..................... | 252/68 |
| 6,051,538 A | * | 4/2000 | Majerczak .................. | 508/469 |

* cited by examiner

Primary Examiner—Ellen M. McAvoy
(74) Attorney, Agent, or Firm—Hunton & Williams

(57) ABSTRACT

A lubricant blend for use on a wire exposed to an HFC refrigerant. The lubricant blend includes an organic phase and an aqueous phase. The organic phase includes a lubricant which has a defined solubility in the HFC refrigerant and a lubricity suitable for application to the wire. The organic phase also includes a solvent in which the lubricant is soluble and, optionally, a hydrophobic surfactant. The aqueous phase includes a surfactant which forms an emulsion between the organic phase and the aqueous phase, which has a defined solubility in a non-CFC containing refrigerant. A magnetic wire lubricant, method of making the lubricant blend, and compressor using the lubricant blend are also described.

24 Claims, No Drawings

MAGNETIC WIRE EXTERNAL LUBRICANT

FIELD OF THE INVENTION

The present invention relates to a lubricant blend for magnetic wires that are employed in devices, such as compressors, which employ a refrigerant. More particularly, the present invention relates to a lubricant blend which imparts coefficient of friction values to magnetic wire comparable to that in which a paraffin lubricant and which is compatible with HFC (hydrofluorocarbons) refrigerants.

BACKGROUND OF THE INVENTION

In the manufacturing of electric motors, magnetic wire is wrapped in the motor in a tight coil. In general, tighter and closer winding of the wire allows more wire to be inserted in a motor of a given size. This generally allows a greater operating efficiency, or space factor. There is an ever-increasing need for motors of even higher efficiency to satisfy energy conservation goals, particularly with hermetic motors used in air conditioners and refrigerators. To meet this end, even more magnetic wire is installed in a motor to achieve a higher space factor.

Prior to assembly, wires are lubricated to minimize friction. This has been accomplished in the past by coating the wire with lubricants such as liquid paraffin. Paraffin has established itself as a preferred external lubricant on magnetic wire to promote windability and insertion in electric motor stators, particularly when used with conventional chlorofluorocarbon (CFC), hydrochlorofluorocarbons (HCFCs), or hydrocarbon (HC) refrigerants. The mechanism by which paraffin promotes windability and insertion is its effectiveness in reducing the wire-to-wire coefficient of friction (COF).

Recent mandates to eliminate CFC refrigerants and other ozone depleting substances require refrigeration compressor manufacturers to convert to non-ozone depleting refrigerants such as hydrofluorocarbons. One example of an HFC is 1,1,1,2-tetrafluoroethane (R134a). This refrigerant exhibits different chemical compatibilities than conventional CFC refrigerants. See, for example, S. G. Sundaresan, W. R. Finkenstadt, *Polyalkylene Glycol and Polyolester Lubricant Candidates for Use With HFC-134a in Refrigeration Compressors,* ASHRAE Transactions 1992, Vol. 98, Pt. 1, AN-92-5-3. As a result, compatibility investigations have determined that a variety of process fluids conventionally used in compressor manufacturing and operation can no longer be used with these non-ozone depleting refrigerants in view of their differing chemical compatibilities.

Testing of compressors with R134a indicates that serious problems may occur if paraffin is used as an external lubricant to promote the windability of magnetic wire in motor stators. Because paraffin is insoluble in R134a, residues of paraffin can detach from the magnetic wire and get transported to and deposited in critical orifices in the compressor, and thus, block the opening of the compressor valve, the refrigerant expansion valve, or other capillaries. This often leads to compressor failure. Consequently, the use of paraffin as a magnetic wire lubricant in conjunction with the use of non-ozone depleting refrigerants, such as R134a, for example, is undesirable.

Alternate external lubricants have been developed in conjunction with internal lubricants. These lubricants are generally baked into the wire coating to further reduce wire-to-wire COF. These external lubricants are generally based on esters of fatty acids and/or pentaerythritol. Although effective, these lubricants can be quite costly, or require the use of uneconomical and/or hazardous solvents for application.

There is also a need to minimize emissions from manufacturing plants. Conventional lubricants such as paraffin are dissolved in organic solvents, which not only constitute a flammability and potential health hazard, but also increase total air emissions. Water-based lubricants have not been successfully implemented due to ineffective lubrication of the wire or poor processing characteristics, such as poor wettability of applicator felts. As a result, it is also desirable to develop a water-based lubricant that can decrease wire-wire COF, while also being soluble in non-ozone depleting refrigerants, such as R134a, over a wide temperature range.

SUMMARY OF THE INVENTION

Thus, there is a particular need for a lubricant blend that imparts a coefficient of friction (COF) value to magnetic wire that is comparable to a magnetic wire to which a paraffin lubricant is applied, but which unlike paraffin lubricant is compatible with non-CFC containing refrigerants. Furthermore, there is a need for a lubricant blend has good lubricity, good processing characteristics and good wettability characteristics in addition to a good solubility in refrigerants.

In a first aspect, the present invention relates to a lubricant blend comprising an emulsion comprising:

(i) an organic phase comprising at least one lubricant, a solvent in which the at least one lubricant is soluble and optionally at least one surfactant, wherein which promote magnet wire lubricity, wherein the at least one lubricant has a solubility in an HFC refrigerant of at least about 0.2% by weight at 0° C. and greater than 0.1% in a blend of 2 parts HFC refrigerant and 1 part of a synthetic oil at −20° C. (referred to later as "special solubility characteristics"); and (ii) an aqueous phase comprising at least one surfactant which forms an emulsion between the organic phase and the aqueous phase and exhibiting the same solubility as the at least one lubricant.

The synthetic oil is a refrigeration grade synthetic oil, such as a polyolester oil or a polyalkylene glycol oil, with suitable solubility characteristics in an HFC refrigerant.

Preferred lubricants include fatty acid esters, such as alkyl stearyl esters. Especially preferred as the lubricant is methyl stearate.

The surfactant which forms an emulsion with the lubricant is preferably a mixture of a non-ionic surfactant having a lower hydophilic/lipophilic balance (HLB) of between 1 and 7 and a non-ionic surfactant having a higher HLB of between 7 and 12.

The solvent is generally a hydrophobic solvent and more preferably a hydrocarbon.

In a second aspect, the invention relates to a method for making a lubricant blend comprising the steps of:

dissolving at least one lubricant and optionally one or more surfactants having an HLB value of 1 to 7, both of which have a solubility in a non-CFC containing refrigerant of at least 0.2% at 0° C. into a hydrophobic solvent and into a first surfactant having an HLB value of 1 to 7 to form a first organic phase mixture;

admixing the organic phase mixture with an aqueous solution comprising 0.5 to 2% of a second surfactant having an HLB value of 7 to 12, with a solubility in a HFC refrigerant of at least 0.2% at 0° C. and greater than 0.1% in 2 parts HFC refrigerant/1 part HFC soluble synthetic oil at −20° C., the proportion of the organic phase mixture and the aqueous phase mixture being such that the ratio of the hydrophilic and hydrophobic surfactant is 0.5 to 2;

mixing the organic and aqueous phases to form a stable emulsion.

In a preferred embodiment, the organic and aqueous phases are admixed by sonication.

In a third aspect, the invention relates to a compressor comprising an electric motor including a magnetic wire wrapped in a coil, wherein the magnetic wire is coated with the above-described lubricant blend.

In its most preferred aspect the lubricant blend comprises methyl stearate and polyethylene-polypropylene glycol copolymers in a suitable solvent. The lubricant blend may be water based and includes methyl stearate and hydrophilic and hydrophobic surfactants comprised of polyethylene glycol polymers, polypropylene glycol polymers, and copolymers thereof. The components are dissolved in a hydrophobic solvent and emulsified in water. Installation of the magnetic wire is eased by the wire-wire friction reduction achieved by these blends.

Unlike paraffin, the lubricant blends of the invention are soluble in non-ozone depleting refrigerants such as the HFCs and more particularly, 1,1,1,2-tetrafluoroethane (R134a), and standard compressor lubricants used in conjunction with R134a. Consequently, there is no danger of lubricant particles clogging critical orifices of the compressor during operation.

DETAILED DESCRIPTION OF PREFERRED EMBODIMENTS

The lubricant blend for magnetic wires is for external use to impart coefficient of friction (COF) values to magnetic wire comparable to that in which a paraffin lubricant is applied. The lubricant blend is particularly advantageous for use with non-ozone depleting refrigerants, such as HFCs including 1,1,1,2-tetrafluoroethane (R134a), since paraffin tends to produce residues that can be deposited in critical orifices of compressors, resulting in blockage. The lubricant blend exhibits excellent solubility in non-ozone depleting refrigerants, while exhibiting similar lubricating characteristics of paraffin, without the residue producing characteristics of paraffin. While the lubricant blends discussed in detail below are dissolved in solvents and applied in liquid form for ease of application (such as application with a felt), they are generally referred to as "dry," because their residue that remains after drying is what imparts the friction reduction to the magnetic wire prior to magnetic wire installation.

The lubricant blend comprises:

at least one lubricant having a solubility as defined above;

optionally at least one hydrophobic surfactant to promote emulsion stability;

a solvent in which the lubricant is soluble; and at least one surfactant which forms an emulsion with the lubricant in an aqueous phase.

HFCs are one exemplary class of refrigerants, although it will be appreciated that the invention is equally applicable to other refrigerants.

The "lubricant which has a solubility in HFC refrigerants of at least 0.2% by weight at 0° C. or greater than 0.1% in a mixture of 2 parts HFC refrigerant and 1 part soluble synthetic oil at −20° C." refers generally to the class of compounds which possess the desired characteristics for application to a magnetic wire in the environment of HFC refrigerant. Generally, except for its solubility characteristics in the presence of non-CFC containing refrigerants, the lubricants which are employed according to the present invention are those which otherwise possess the properties of paraffin, including a similar lubricity, coefficient of friction, solubility in low boiling point solvents and/or wettability. Classes of lubricants include the natural or synthetic fatty acid esters and more particularly alkyl stearates. A particularly preferred lubricant is an organic stearate such as methyl stearate.

The "solvent in which the lubricant is soluble" generally encompasses any solvent which will dissolve the lubricant and which will completely evaporate under normal application conditions. Generally, the solvent is a low boiling point hydrocarbon solvent and, depending on the lubricant employed, may desirably be a hydrophobic solvent. A particularly preferred solvent is limonene (4-isopropenyl-1-methylcyclohexene), (Florida Chemical Company, Lake Alfred, Fla.) or VM & P naphtha (a petroleum distillate with a boiling point of about 100° C. to about 160° C.), (Allpro Corp. Tampa, Fla.). Other exemplary solvents include pentane, hexane, heptane, octane, cyclohexane and the like.

The "surfactant which forms an emulsion" is generally selected so as to form an emulsion with a hydrocarbon solvent including the dissolved lubricant and an aqueous phase and exhibit the "Special" solubility characteristics. Generally, such surfactants are chosen from among the following classes: polyethoxy esters of fatty acids, phenolics, tallows, etc., or poly(ethoxy, propoxy) copolymers. A combination of surfactants, such as hydrophobic and hydrophilic surfactants, may be employed. A particularly preferred embodiment employs a combination of lower molecular weight (<3000) non-ionic surfactants including a first surfactant having a lower HLB value of between 1 and 7 and a second surfactant having an HLB value between 7 and 12, such as a combination of Tetronic 150R1 ((polyoxypropylene-polyoxyethylene) alkoxylated diamine), Tetronic 701 ((polyoxypropylene-polyoxyethylene) alkoxylated diamine) (BASF Corp., Parsippany, N.J.) and Pluronic P123 (polyoxypropylene-polyoxyethylene block copolymer), Pluronic 31RI (polyoxypropylene-polyoxyethylene block copolymer), Pluronic L122 (polyoxypropylene-polyoxyethylene block copolymer) (BASF Corp., Parsippany, N.J.). The surfactant is generally employed in amounts ranging between 0.5 and 2% by weight.

The emulsions of the invention are formed by combining the lubricant, dissolved in an organic solvent, with an aqueous phase, the formation and stabilization of the emulsion being facilitated by the presence of one or more surfactants in the organic and/or aqueous phases as described above. Generally, the emulsions comprise between 2 and 20% of organic phase and 80 and 98% of the aqueous phase and more preferably between 5 and 10% of organic phase and 90 and 95% of the aqueous phase. In a preferred embodiment, the emulsion is formed by sonication of the admixture of the aqueous and organic phases.

The lubricant blend in a first preferred embodiment comprises methyl stearate, a surfactant, and a solvent. More specifically, the lubricant blend of the first preferred embodiment comprises methyl stearate and polyethylene-polypropylene glycol copolymers, dissolved in a solvent such as VM&P Naphtha. As a modification to this mixture, a synthetic polyester wax such as Kester wax may be added.

Alternatively, in a second preferred embodiment, the lubricant blend comprises methyl stearate, hydrophobic and hydrophilic surfactants such as polyethylene-polypropylene glycol copolymer(s) and/or tetrafunctional polyethylene-polypropylene glycol copolymer adducts of ethylene diamine dissolved in a hydrophobic solvent and emulsified in an aqueous phase.

Both of the above-noted first and second preferred embodiments are suitable for felt wipe application to magnetic wire in order to impart wire-wire coefficient of friction (COF) values comparable to that of paraffin. The key advantages of the water-based blend over conventional solvent based lubricants are minimal utilization of flammable organic solvents, while maintaining improved solubility in non-ozone depleting refrigerants, such as R134a, as described above.

The primary component for the lubricant blend of the first and second preferred embodiments is methyl stearate. The methyl stearate is generally present in the blend in the range of 1–5% by weight of the lubricant blend. Preferably, the methyl stearate is present in the range of 4–5% by weight of the lubricant blend. The reasons for its selection are its solubility in non-ozone depleting refrigerants, such as R134a refrigerant. The lubricant blends of the first and second preferred embodiments exhibit the "Special solubility characteristics," have a melt point above room temperature (36° C.), and are effective as a barrier lubricant in combination with other lubricants.

Particularly, the first preferred embodiment of the lubricant blend results from the mixture of methyl stearate with a synthetic polyester wax, and polyethylene-polypropylene glycol copolymers. In accordance with procedures well known in the art, the foregoing are blended with an organic solvent such as naphtha. The manner and order in which the components of the magnetic wire lubricant compositions of the present invention are combined and compounded is generally not critical, as long as the proper amounts of ingredients are selected to ensure the desired mixture of the first embodiment is obtained. The compounding is performed by one skilled in the art, under proper safety procedures for the preparation of volatile organic solvents, and under conditions that will not cause undue hazards in processing.

A major problem with aqueous-based lubricants is that the organic components in the lubricant tend to separate into a separate phase from the aqueous solvent. The second preferred embodiment of the present invention relates to dissolving methyl stearate in a hydrocarbon solvent, such as naphtha or 4-isopropenyl-1-methylcyclohexene. It was found that about 50% by weight methyl stearate was soluble in these solvents. Other aliphatic or cycloaliphatic hydrocarbon solvents are also suitable, including pentane, hexane, heptane, octane, cyclohexane, and the like. Aromatic hydrocarbon solvents, such as toluene or xylene, were found not to be as desirable, due to partial precipitation of methyl stearate from the emulsion. Most likely, this precipitation resulted from the partial solubility of these solvents in water.

To form a stable emulsion in accordance with the second preferred embodiment, a nonionic surfactant with a relatively low HLB value (1–7) is added to the hydrocarbon phase and a nonionic surfactant with a relatively high HLB value (7–12) is added to the aqueous phase. These surfactants are comprised of polyethylene glycol polymers, polypropylene glycol polymers, and polyethylene-polypropylene glycol copolymers. HLB values are used to classify nonionic surfactants according to their emulsification characteristics: HLB<7 indicates solubility in oils and insolubility in water, HLB>7 indicates solubility in water, insolubility in oils. In accordance with the second embodiment, the formulation and method to combine these ingredients (as in Example 10, below) are: Dissolution of 45% by weight methyl stearate and 10% by weight Tetronic 150R1 in 45% by weight VM&P Naphtha (optionally, 4-isopropenyl-1-methylcyclohexene may be used). One part of this mixture is then combined with nine parts of a 1% Pluronic P123 aqueous solution by addition of the aqueous phase to the hydrocarbon phase.

The method employed to combine the additives also affects emulsion stability. For instance, combining both surfactants with the methyl stearate in the hydrocarbon phase did not form as stable emulsion as the method described above. Sonication also improves the stability of the resulting emulsion. Optionally, high shear mixing can be used in place of sonication.

The present invention is illustrated by the following examples. All compositions are given in percent by weight. For purposes of identifying the particular materials used in the examples and experiments provided below, the following materials were utilized:

Materials

Lubex solution—(5% paraffin (melt point 50°–55° C.) dissolved in approximately 9% xylenes and 86% VM&P Naphtha), P.D. George Co., St. Louis, Mo.

Arctic EAL 46 Polyolester oil, viscosity=41.3 cSt @ 40° C., Mobil Chemical Corp. (Formerly referred to as Mobil SR484)

Methyl stearate, Witco Chemical Corp., New York, N.Y.

Methyl stearate, Emery 2218, Henkel Corp., Los Angeles, Calif.

Tetronic 150R1, 701, BASF Corp., Parsippany, N.J.

Pluronic P123, 31R1, L122, BASF Corp., Parsippany, N.J.

Pluronic P123, BASF Corp., Parsippany, N.J.

Kester wax 48, Koster Keunen, Inc., Sayville, N.Y.

d-Limonene (4-isopropenyl-1-methylcyclohexene), Florida Chemical Company, Lake Alfred, Fla.

VM&P Naphtha, Allpro Corp., Tampa, Fla.

White Felt (5/16" thick)

Solubility Experiments

The initial tests of lubricant candidates involved testing the solubility of the lubricant in Arctic EAL 46 polyolester oil, R134a, and a blend of approximately 2 parts R134a and 1 part Arctic EAL 46. Solubility studies in Arctic EAL 46 oil were done in sealed glass vials vacuum-dried for>2 hours at 80° C. Solubility studies in R134a and blends of R134a and polyolester oil were done in thick-walled glass tubes evacuated to less than 50 microns of vacuum and charged with approximately 1 gram of R134a by condensing a known partial pressure of gas in the tube with liquid nitrogen. These tubes were sealed by welding the tubes shut with a torch. Determination of solubility at various temperatures were done visually.

Of the large number of candidate materials evaluated, including beeswax, candelilla wax, montan wax, carnauba wax, polyvinyl acetates, synthetic polyester waxes, and other Pluronic polyethylene oxide-polypropylene oxide (PEO-PPO) surfactants, the candidates that exhibited the best solubility are reported in Tables 1, 2, and 3. It was not initially obvious on the basis of chemical structure, melt point, or other physical property that these materials would be more soluble than the above mentioned materials.

Of the leading candidate materials, Kester wax #48 showed only a marginal improvement in solubility characteristics over that of paraffin. However, there was substantial improvement for methyl stearate and Pluronic P123.

TABLE 1

Solubility Study in Arctic EAL 46 Polyol Ester Oil
(0.4% Concentration)

| Material | Room Temp. | 60° C. | 4° C. | −20° C. |
|---|---|---|---|---|
| Paraffin* | S | S | I | I |
| Methyl stearate | S | S | S | S |
| Kester Wax #48 | S | S | MS | I |
| Pluronic P123 | S | NT | NT | NT |

I = insoluble, S = soluble, MS = mostly soluble, NT = not tested.
*0.1% solution - Other work shows paraffin insoluble at 0.2% at room temperature.

TABLE 2

Solubility Study in R134a (0.2% Concentration)

| Material | Room Temp. | 60° C. | 4° C. | −20° C. |
|---|---|---|---|---|
| Paraffin | I | I | I | I |
| Methyl stearate | S | S | S | I |
| Kester Wax #48 | I | MS | I | I |
| Pluronic P123 | S | I | S | S |

TABLE 3

Solubility Study in 1 Gram R134a/0.5 ml of
Arctic EAL 46 (0.13% Concentration)

| Material | Room Temp. | 60° C. | 4° C. | −20° C. |
|---|---|---|---|---|
| Paraffin** | S | S | I | I |
| Methyl stearate | S | S | S | S |
| Kester Wax #48 | S | S | MS | I |
| Pluronic P123 | S | S | S | S |

**= 50/50 blend of R134a and Arctic EAL 46 at 0.1% concentration.

Coefficient of Friction Studies

Table 4 lists the wire-to-wire COF test results when applied to magnetic wire with a felt wipe procedure. This procedure consisted of blending 5% lubricant in either VM&P Naphtha solvent or water and/or cosolvent. An effective cosolvent was d-Limonene, in which Kester wax #48 is soluble up to 25% and methyl stearate is soluble up to 50% when gently heated. These solutions were agitated by shaking until homogeneous. Lubricant solution was then dispensed in a container to allow saturation into two pieces of 1"×½"×5/16" felt. 18-inch lengths of 0.0403" diameter NEMA MW 35 (polyester imide basecoat and polyamide-imide topcoat) magnetic wire were then pulled between the saturated felt pieces and allowed to air dry.

Prior to COF measurements, two wires were elongated 2% to straighten and were mechanically fixed to the platform of a Testing Machine Incorporated Inclined Plane COF Tester, Model 32-25. Two other wires were mechanically attached to a 4 oz. sled. The sled was then placed on the platform, such that the two sets of wires lay perpendicular and contacted at four points.

Static COF was evaluated by activating the motor driven platform, which uniformly increased the angle of incline until the sled started moving. The COF value was determined from the equation:

$$COF = \tan \theta$$

where θ is the measured angle of the onset of motion.

Dynamic COF was measured, using the same equation, by fixing the platform at increasing angles, until the sled could sustain a sliding action after being gently pushed. Table 4 provides both the static and dynamic COF for Examples 1–7.

TABLE 4

Wire-to-Wire Coefficient of Friction Values For Various
Solvent-Based Lubricant Solutions

| Blend Description: | Coefficient of Friction (COF) | |
|---|---|---|
| | Static | Dynamic |
| Example: | | |
| 1. Unlubricated wire | 0.158 | 0.096 |
| 2. 5% paraffin in VM&P Naphtha | 0.141 | 0.070 |
| 3. 5% Arctic EAL 46 in VM&P Naphtha | 0.204 | 0.088 |
| 4. 5% Methyl Stearate in VM&P Naphtha | 0.213 | 0.114 |
| 5. 5% Kester Wax #48 in VM&P Naphtha | 0.105 | 0.070 |
| 6. 4% Methyl Stearate/1% Arctic EAL 46 in VM&P Naphtha | 0.105 | 0.088 |
| 7. 1% Kester Wax #48/3% Methyl Stearate/ 1% Arctic EAL 46 in VM&P Naphtha | 0.141 | 0.088 |

The results in Table 4 indicate that the use of Arctic EAL 46 or methyl stearate alone does not appear to promote COF reduction. However, combining them in the ratio provided above is effective in reducing COF to values similar to paraffin. Kester Wax #48 appears to be effective as a single component lubricant, but its poorer solubility in non-ozone depleting refrigerants, such as R134a, makes it undesirable to use as an exclusive lubricant components. However, its use in combination with methyl stearate and/or Arctic EAL 46 is beneficial, though not necessary, as it imparts lubrication properties not reflected in the COF measurement reported in Table 4.

Table 5 provides wire-to-wire coefficient of friction values for water based lubricants of the second embodiment.

TABLE 5

Wire-to-Wire Coefficient of Friction Values For
Water-Based Lubricant

| Blend Description: | Coefficient of Friction (COF) | |
|---|---|---|
| | Static | Dynamic |
| 8. 5% Pluronic P123 in Water | 0.070 | 0.035 |
| 9. 1% Kester Wax #48/3% Methyl Stearate/ 1% Pluronic P123/15% d-Limonene in Water | 0.096 | 0.079 |

As provided in Table 5, the Pluronic P123 surfactant (Example 8) provided very effective COF results. However, the use of P123 alone is undesirable, as it forms a paste film at room temperature, its high viscosity would lead to poor saturation of the felt, and high water solubility may compromise its practicality in industrial environments.

Blending this material with Kester wax #48 and methyl stearate (as in Example 9) provides substantial performance benefits, while overcoming the deficiencies of P123 noted above.

Solubility, stability, and COF studies of aqueous lubricants in HFC refrigerant were also examined. The solubility testing and stability testing were performed by conducting tests in accordance with ASHRAE Test Method 97-1989. This test method involves dispensing 2 ml of lubricant solution in a thick walled test tube (Ace Glass #38810-92) containing a strip of steel and a strip of copper, and vacuum drying. The tube is exposed to an atmosphere of HFC refrigerant, and approximately 2 ml of liquid HFC refrigerant is condensed in the tube by immersing the tube in liquid nitrogen, and immediately sealing the tube. This lubricant was found to be soluble in R134a at room temperature (paraffin is insoluble), mostly soluble at 4° C., and partially soluble at −10° C.

Example 10 involved GE Specification B22M62C magnetic wire (NEMA MW-35). This wire is a heavy coated polyesterimide with polyamide-imide overcoat insulated round copper magnetic wire. Characteristics of the B22M62C magnetic wire include the following: slow elongation (i.e., at least 28% elongation before breaking); low stress elongation (stiffness) not less than 0.14%; enhanced flexibility and scrape resistance of the exterior; and good resistance to aqueous and organic solvent. Example 10 was prepared and applied to 0.0453" (0.115 cm) diameter GE Specification B22M62C magnetic wire (NEMA MW-35) by saturating a felt with the liquid and passing the enameled wire through a slit in the felt. The lubricant was allowed to air dry after application. COF values were measured using the incline plane method described above.

Other surfactants were also evaluated using the blending procedure described above. Pluronic 31R1, L122, and Tetronic 701 were added at 10% by weight to the hydrocarbon phase in place of Tetronic 150R1. The one part hydrocarbon phase was then combined with the nine parts aqueous phase, consisting of either 1% Pluronic P123 or 1% Tetronic 90R4 (Examples 11–17).

Examples 10–17 were sonicated for at least 15 minutes and observed for dispersion stability. The only emulsion that remained stable for two days or more was Example 10. No evidence of phase separation in Example 10 was apparent after remaining unperturbed for several days. Examples 11–17 exhibited phase separation within two days.

TABLE 6

Solubility, Stability, and COF Studies of Aqueous Lubricant Samples

| | Examples: | | | | | | | |
|---|---|---|---|---|---|---|---|---|
| | 10 | 11 | 12 | 13 | 14 | 15 | 16 | 17 |
| Hydrocarbon Phase | | | | | | | | |
| Methyl Stearate | 4.5 | 4.5 | 4.5 | 4.5 | 4.5 | 4.5 | 4.5 | 4.5 |
| Tetronic 150R1 | 1.0 | 1.0 | | | | | | |
| Tetronic 701 | | | 1.0 | 1.0 | | | | |
| Pluronic 31R1 | | | | | 1.0 | 1.0 | | |
| Pluronic L122 | | | | | | | 1.0 | 1.0 |
| VM&P Naphtha | 4.5 | 4.5 | 4.5 | 4.5 | 4.5 | 4.5 | 4.5 | 4.5 |
| Aqueous Phase | | | | | | | | |
| Pluronic P123 | 1.0 | | 1.0 | | 1.0 | | 1.0 | |
| Tetronic 90R4 | | 1.0 | | 1.0 | | 1.0 | | 1.0 |
| Deionized Water | 89.0 | 89.0 | 89.0 | 89.0 | 89.0 | 89.0 | 89.0 | 89.0 |
| Emulsion Stability | Good | | | | < Poor > | | | |
| Wire/Wire COF* | | | | | | | | |

TABLE 6-continued

Solubility, Stability, and COF Studies of Aqueous Lubricant Samples

| | Examples: | | | | | | | |
|---|---|---|---|---|---|---|---|---|
| | 10 | 11 | 12 | 13 | 14 | 15 | 16 | 17 |
| Static | 0.122 | | | < Not Tested > | | | | |
| Dynamic | 0.079 | | | | | | | |

*= COF values for unlubricated wire: 0.185 static and 0.105 dynamic, for paraffin lubricant: 0.105 static and 0.070 dynamic.

TABLE 7

Comparison of Winding Insertion Forces

| Blend Description: | Insertion Force, lbs | Std dev. |
|---|---|---|
| 2% Pluronic 31R1 (copolymer of ethylene oxide and propylene oxide), 3% methyl stearate, 95% VM&P Naphtha; | 673 | 44 |
| Paraffin | 648 | 46 |
| Commercial R134a-soluble wire lubricants | ~800 | n/a | n/a = not applicable

Table 7 shows a comparison of winding insertion forces for an embodiment of the present invention versus paraffin and commercially available R134a-soluble wire lubricants. The comparison of the present invention and the paraffin was carried out on 0.453" GE Specification B22M62C copper magnetic wire (NEMA MW-35). This wire was wound onto a stator, GE Model S3256 (30 frame, 4¼" stack height, 24 slots, single phase), and measured with an MAT force gauge. The insertion forces of the present invention, i.e., the forces required to push the windings into the stator slots were compared with those required to wind paraffin-coated wire. Twenty-five stators were wound with wire coated with the present invention, followed by twenty five stators tested with paraffin coated wire; the average insertion force for each lubricant was calculated. These results were compared with previous results taken of commercially available R134a-soluble lubricant. Test results indicate that the present invention compares favorably to the paraffin, and that the present invention is superior to commercially available R134a-soluble lubricants.

While the foregoing examples illustrate and describe the use of the present invention, they are not intended to limit the invention as disclosed in certain preferred embodiments herein. Therefore, variations and modifications commensurate with the above teachings and the skill and/or knowledge of the relevant art, are within the scope of the present invention.

What is claimed is:

1. A lubricant blend comprising an emulsion comprising:
   (i) an organic phase comprising (a) at least one lubricant which has a solubility in an HFC refrigerant of at least about 0.2% by weight at 0° C. and greater than about 0.1% at −20° C. in a blend of 2 parts HFC refrigerant and 1 part compatible synthetic oil and a lubricity suitable for application to a magnetic wire, (b) a solvent in which said at least one lubricant is soluble and optionally (c) at least one hydrophobic surfactant;
   (ii) an aqueous phase comprising at least one surfactant which forms an emulsion between said organic phase and said aqueous phase, which has a solubility in a non-CFC containing refrigerant of at least 0.1% at room temperature.

2. The lubricant blend of claim 1, wherein said lubricant is a fatty acid ester.

3. The lubricant blend of claim 2, wherein said fatty acid ester is a natural fatty acid ester.

4. The lubricant blend of claim 2, wherein said fatty acid ester is a synthetic fatty acid ester.

5. The lubricant blend of claim 2, wherein said fatty acid ester is an alkyl stearate.

6. The lubricant blend of claim 5, wherein said alkyl stearate is methyl stearate.

7. The lubricant blend of claim 5, wherein said refrigerant is a hydrofluorocarbon.

8. The lubricant blend of claim 7, wherein said HFC is 1,1,1,2-tetrafluoroethane.

9. The lubricant blend of claim 1, wherein said solvent is an organic solvent.

10. The lubricant blend of claim 1, wherein said solvent is limonene or a petroleum distillate with a boiling point of about 100° C. to about 160° C.

11. The lubricant blend of claim 1, wherein said surfactant comprises a combination of two or more surfactants.

12. The lubricant blend of claim 11, wherein said combination of surfactants comprises a hydrophobic and a hydrophilic surfactant.

13. The lubricant blend of claim 12, wherein said hydrophobic surfactant has a solubility in HFC of at least 0.1%.

14. The lubricant blend of claim 12, wherein said hydrophobic and hydrophilic surfactant comprises a combination of lower molecular weight non-ionic surfactants including a first surfactant having a lower HLB value of between 1 and 7 and a second surfactant having an HLB value between greater than 7 and 12.

15. The lubricant blend of claim 14, wherein said combination of surfactants comprises between 0.5 and 2.0% by weight of (polyoxypropylene-polyoxyethylene) alkoxylated diamine and 0.5% and 2.0% by weight of polyoxypropylene-polyoxyethylene block copolymer.

16. A magnetic wire lubricant for motor applications in compressors that utilize non-ozone depleting refrigerants comprising:
(i) methyl stearate;
(ii) polyethylene glycol polymer, polypropylene glycol polymer, or polyethylene-polypropylene glycol copolymer; and
(iii) a hydrocarbon solvent.

17. The magnetic wire lubricant of claim 16 comprising 1–5% by weight of said methyl stearate; 0.1 to 5.0% by weight of said polyethylene glycol polymer, polypropylene glycol polymer, or polyethylene-polypropylene glycol copolymer; and the remainder of solvent.

18. The magnetic wire lubricant of claim 17 wherein said methyl stearate comprises 4–5% by weight of said lubricant.

19. The magnetic wire lubricant of claim 18 comprising 4% by weight methyl stearate; 1% by weight of said polyethylene glycol polymer, polypropylene glycol polymer, or polyethylene-polypropylene glycol copolymer; and the remainder of said solvent.

20. The magnetic wire lubricant of claim 16 further comprising a synthetic polyester wax comprising 1% of said lubricant.

21. The magnetic wire lubricant of claim 16 wherein said solvent is naphtha, 4-isopropenyl-1-methylcyclohexene, or mixtures thereof.

22. A method for making a lubricant blend comprising the steps of:
(i) dissolving (a) a lubricant which has a solubility in a HFC refrigerant of at least about 0.2% by weight at 0° C. and greater than about 0.1% at −20° C. in a blend of 2 parts HFC refrigerant and 1 part compatible synthetic oil, and a lubricity suitable for application to a magnetic wire, into (b) a hydrophobic solvent and into (c) a first surfactant having an HLB value of 1 to 7 to form a first organic phase mixture;
(ii) admixing the organic phase mixture with an aqueous solution comprising 0.2 to 2.0% of a second surfactant having an HLB value of 7 to 12, the proportion of the organic phase mixture and the aqueous phase mixture being such that a stable emulsion is formed;
(iii) mixing the organic and aqueous phases to form a stable emulsion.

23. The method of claim 22, wherein the organic and aqueous phases are admixed by sonication.

24. A compressor comprising an electric motor including a magnetic wire wrapped in a coil, wherein the magnetic wire is coated with a lubricant comprising:
(i) an organic phase comprising (a) at least one lubricant which has a solubility in an HFC refrigerant of at least about 0.2% by weight at 0° C. and greater than about 0.1% at −20° C. in a blend of 2 parts HFC refrigerant and 1 part compatible synthetic oil and a lubricity suitable for application to a magnetic wire, (b) a solvent in which said at least one lubricant is soluble and optionally (c) at least one hydrophobic surfactant; and
(ii) an aqueous phase comprising at least one surfactant which forms an emulsion between said organic phase and said aqueous phase, which has a solubility in a non-CFC containing refrigerant of at least b 0.1% at room temperature.

* * * * *